Feb. 27, 1968 W. A. BRICE 3,370,429
COMBINED ENGINES
Filed Oct. 14, 1965 2 Sheets-Sheet 2
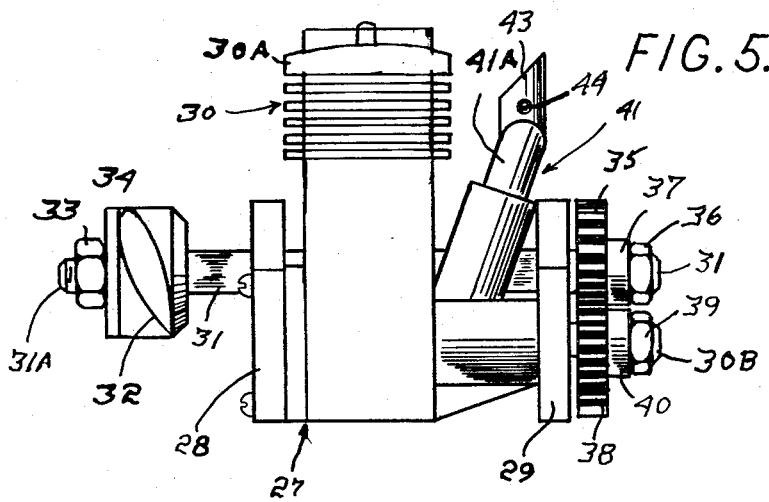
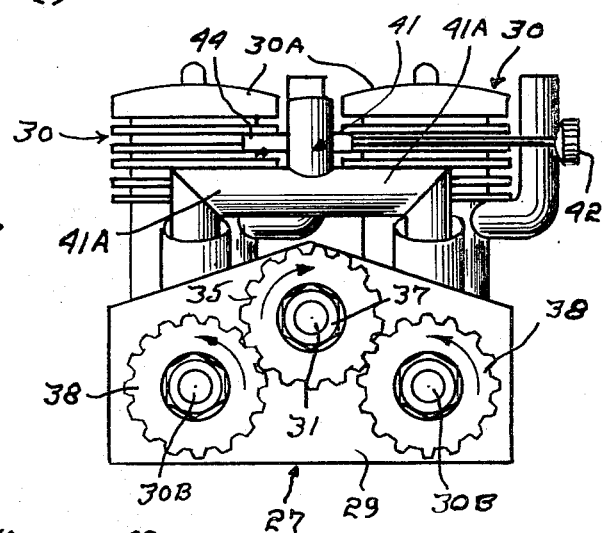
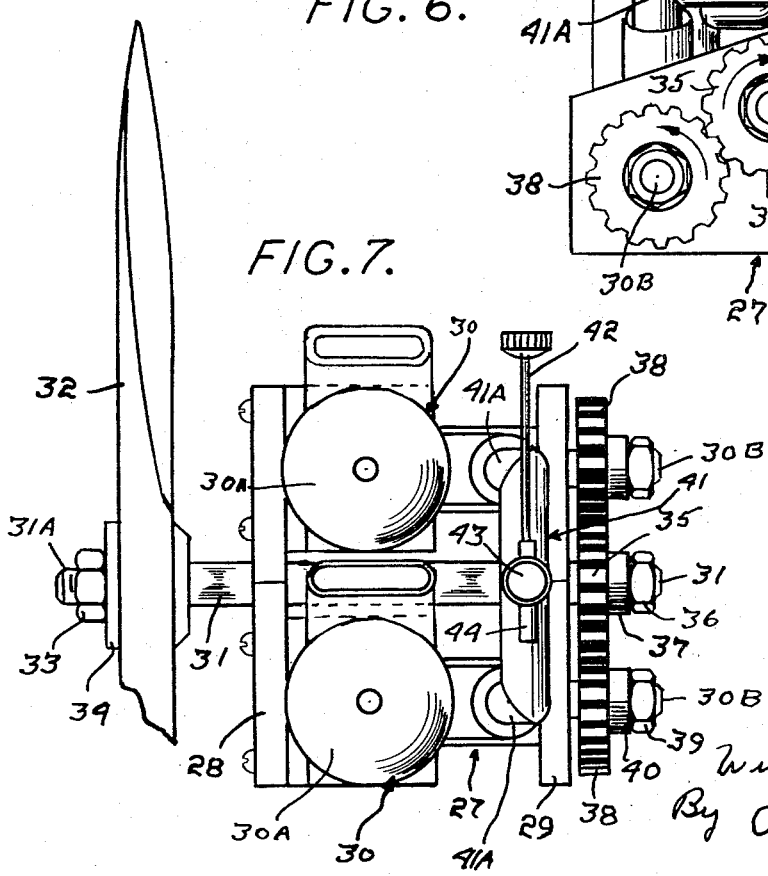
Inventor
William A. Brice
By [Attorney signature]
Attorney United States Patent Office 3,370,429
Patented Feb. 27, 1968

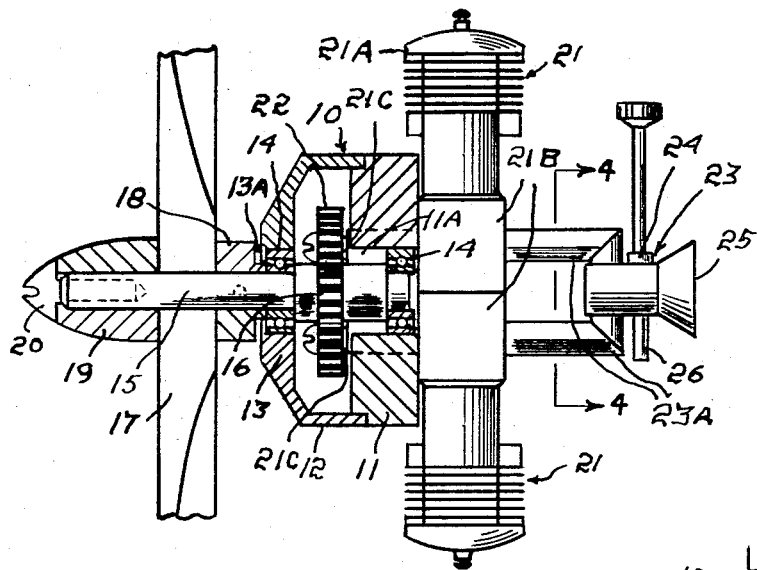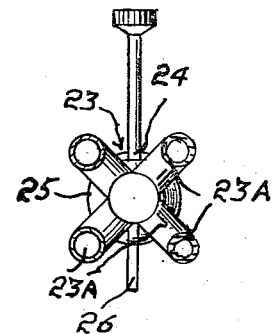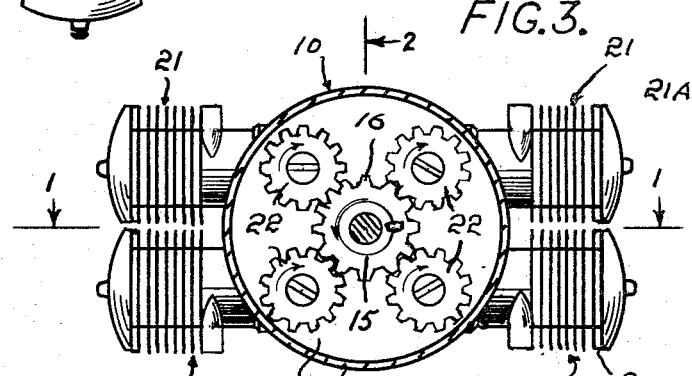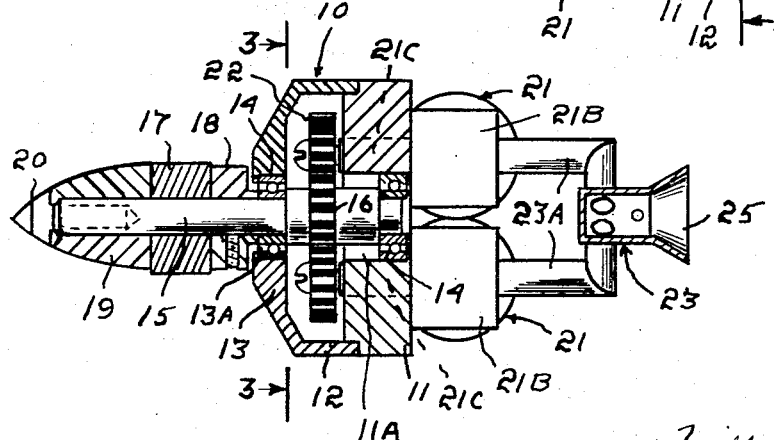

3,370,429
COMBINED ENGINES
William A. Brice, South Portland, Maine, assignor, by mesne assignments, to Ametek, Inc., New York, N.Y., a corporation of Delaware
Filed Oct. 14, 1965, Ser. No. 495,980
4 Claims. (Cl. 60—97)

ABSTRACT OF THE DISCLOSURE

At least two engines of the two cycle, two stroke type are combined into a single assembly with a single output power shaft by mounting of the engines on interconnecting means that journals the power shaft, with the crankshafts of the individual engines connected to the power shaft in a timing-driving relationship. Each engine retains its separate crankcase with the fuel intake in the crankcase chamber communicating with a single carburetor through connections of equal length and cross sectional area.

The present invention relates to power plants consisting of interconnected internal combustion engines, each of the two stroke, two cycle type.

Power plants in accordance with the invention are herein discussed for use in model craft, such as model air and water craft, but the scope of the invention is not limited to such uses as larger power plants may be made for use in propelling helicopters or gyrocopters where, as in the case of model craft, there is also a demand for higher horsepower in relation to weight than is provided by presently available power plants.

The general objective of the invention is to provide power plants that will effectively meet the above generally indicated demand. In accordance with the invention, this objective is attained by the use of means interconnecting an even number of identical engines, each of the single cylinder, two stroke, two cycle, internal combustion type. A propeller shaft is journalled in the interconnecting means and each engine has a crankshaft, the crankshafts being connected to the propeller shaft in a timing-driving relationship. The power plant also includes a single carburetor including connections, of equal length and of equal cross sectional area, with the intake of each engine. The crankshafts of the engines are set relative to each other to provide the same angular relationship between the cycles as would be normal for an internal combustion engine of the same type and having the same number of cylinders.

The preferred arrangement of the individual engines, at least for use in model craft, is such that there are two of them mounted side-by-side with their cylinders parallel and in a plane at right angles to the propeller shaft and there may be two such sets, one set opposite the other and both sets in the same plane. These arrangements combine such advantageous features as simplicity of construction, desirable overall dimensions, power, and smoothness of operation at high and low speeds.

In the accompanying drawings, there are shown illustrative embodiments of the invention for model craft use from which these and other of its objectives, novel features, and advantages will be readily apparent.

In the drawings:

FIGURE 1 is a longitudinal section taken between the two engines of the two sets as indicated by the section lines 1—1 of FIGURE 3, FIGURE 2 is a longitudinal section taken approximately along the indicated lines 2—2 of FIGURE 3.

FIGURE 3 is a transverse section taken approximately along the indicated lines 3—3 of FIGURE 2, FIGURE 4 is a transverse section taken along the indicated lines 4—4 of FIGURE 1 but showing all four carburetor-to-intake conduits, FIGURE 5 is a side elevation of a power plant in accordance with another embodiment of the invention, FIGURE 6 is a rear view of the power plant of FIGURE 5 with the propeller omitted, and FIGURE 7 is a top elevational view thereof.

The power plant illustrated by FIGURES 1-4, has a generally indicated chamber 10 defined by a back wall 11 to which the cylindrical flange 12 of the front wall 13 is secured. The back wall 11 has a bore 11A in axial alinement with a bore 13A in the front wall. Bearing units 14 are located in the bores 11A and 13A in support of the shaft 15. A gear 16 is splined to the shaft 15 within the chamber 10. A propeller 17 is shown as clamped against a support 18 fast on the shaft 15 by a head 19 anchored by a screw 20 threaded axially into the shaft 15.

Internal combustion engines are generally indicated at 21. These are of the single cylinder, two stroke, two cycle type provided with "glow" plugs 21A and widely used in model air and water craft. The base 21B of each engine 21 is shown as approximately cube-shaped and is secured to the rear face of the rear chamber wall 11, cementing having proved satisfactory. There are four engines 21 and these are arranged in oppositely disposed pairs with the cylinders of each pair abutting in a side-by-side relationship and all with their axes in a common plane transverse with respect to the axis of the shaft 15. Each such engine also has a crankshaft 21C extending forwardly through the chamber wall 11 into the chamber 10 where each has a gear 22 anchored thereto in mesh with the gear 16. Each gear 22 is set in mesh with the gear 16 so that the angular relationship of the crankshafts is that normal for an internal combustion engine of the same type but having four cylinders.

The power plant has a carburetor 23 connected to each engine and having an adjustable valve 24 for adjusting the mixture of air and fuel, the former entering through the air intake 25 and the latter through the gas inlet 26 when connected to a fuel tank, not shown.

In the embodiment of the invention illustrated by FIGURES 5-7, the power plant is shown as having a generally indicated mount 27 including a front wall 28 and a rear wall 29. Supported by the mount 27 and attached to the front wall 28 is a pair of internal combustion engines 30, both generally similar to the engines 21 in that they are of the single cylinder, two stroke, two cycle type and utilize glow plugs 30A. The engines 30 are spaced slightly apart but are like either set of engines 21 in that they have their cylinder axes parallel and in a plane transverse with respect to the axis of the propeller shaft 31 which is suitably journalled in the walls 28 and 29.

The forward end 31A of the shaft 31 is shown as reduced in diameter to provide a shoulder against which the propeller 32 is clamped by a nut 33 threaded on the shaft end 31A against the washer 34.

The rear end of the shaft 31 has a gear 35 anchored thereon as by the nut 36 seated against an interposed washer 37. Each engine 30 has its crankshaft 30B extending through the rear wall 29 where it has a gear 38 clamped thereto as by a nut 39 set against a washer 40 and in mesh with the gear 35. It will be noted that the shafts 30B are below the shaft 31. It will be understood that the gears 38 are set in mesh with the gear 35 to provide an arrangement between the two crankshafts 30C that is normal for an internal combustion engine of the same type but having two cylinders.

Each engine 30 has a generally indicated carburetor 41 having an adjustable valve 42 for adjusting the air-fuel mixture, the former entering through the intake 43 and the latter through the gas line 44 when connected to a suitable source not shown.

It will be apparent that in each embodiment, the connection between the crankshafts and the propeller shafts establishes both a driving and a timing relationship. Other drives effecting this relationship may be employed such as chain and timing belt drives.

It should also be noted that each carburetor of both embodiments includes a connection with the intake of each engine of that power plant. Each such connection is identified by the suffix addition "A" to the reference numeral generally indicating the appropriate carburetor and is of the same length and the same cross sectional area thus ensuring the correct mixture and volume of fuel and air to each engine through the common manifold at the predetermined inlet port timing cycle ensuring smooth operation in both low and high speed ranges as is highly desirable where speed changes are to be effected, particularly where such changes are to be in response to remote controls.

I claim:

1. In a power plant for air and water craft, an even number of identical engines each of the single cylinder, two stroke, two cycle, internal combustion type having crankcase compression with a fuel intake in said crankcase, means interconnecting said engines as a unit, a propeller shaft journalled in said means, each engine including a crankshaft journalled in its separate crankcase, said crankshafts being connected to said propeller shaft in a timing-driving relationship, and a single carburetor including connections of equal length and of equal cross sectional area with the crankcase intake of each engine, the crankshafts of said engines being set relative to each other to provide the same angular relationship between the cycles as would be normal for an internal combustion engine of the same type having the same number of cylinders.

2. The power plant of claim 1 in which the engines are in a common plane.

3. The power plant of claim 1 in which there are two engines arranged side-by-side with their cylinders parallel and in a plane at right angles to the propeller shaft.

4. The power plant of claim 1 in which there are two opposite sets of engines, each set including two engines arranged side-by-side with their cylinders parallel, all of the engines being in a plane at right angles to the propeller shaft.

References Cited
UNITED STATES PATENTS

| | | | |
|---|---|---|---|
| 968,127 | 8/1910 | Cloud | 60—97 |
| 1,627,108 | 5/1927 | Morehouse | 60—97 |
| 1,780,454 | 11/1930 | White | 123—53 |
| 2,053,242 | 9/1936 | Kahn | 123—53 |
| 2,504,988 | 4/1950 | Kronlund | 60—97 X |

EDGAR W. GEOGHEGAN, *Primary Examiner.*